Figures 1, 2:
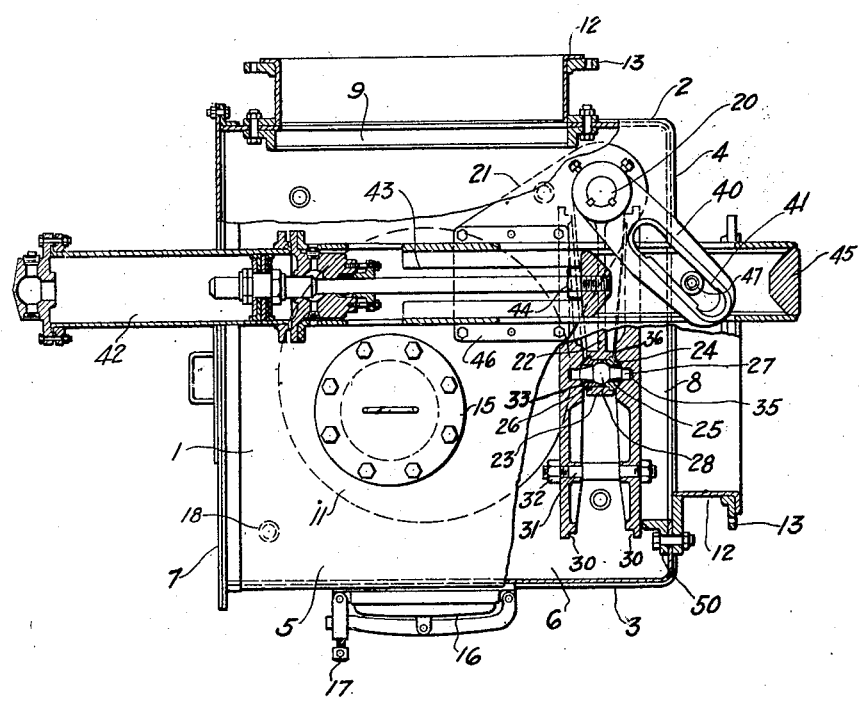

April 19, 1932.   O. TWEIT ET AL   1,854,531

VALVE

Filed Aug. 25, 1928

OLAV TWEIT
SYBREN R. TYMSTRA
INVENTORS

BY *Forbes Silsby*
ATTORNEY

Patented Apr. 19, 1932

1,854,531

UNITED STATES PATENT OFFICE

OLAV TWEIT, OF ORANGE, NEW JERSEY, AND SYBREN R. TYMSTRA, OF FLUSHING, NEW YORK, ASSIGNORS TO SEMET-SOLVAY ENGINEERING CORPORATION, OF NEW YORK, N. Y., A CORPORATION OF NEW YORK

VALVE

Application filed August 25, 1928. Serial No. 302,126.

This invention relates to valves and operating mechanism therefor and more particularly to multi-way valves adapted for use in pipe lines or mains of combustible gas generating apparatus, as for example, in back-run water gas sets.

One object of the present invention is to provide a valve of rugged and simple construction that is durable and efficient in operation. Another object is to provide a multi-way valve with satisfactory operating mechanism for beneficially utilizing the energy supplied for moving the plates of the valve and operable to efficiently move the valve plates to closed positions and maintain them in such positions.

To insure gas-tight closures for multi-way valves, it is advisable to have a greater force effective on the valve plates when in closed position than is necessary merely to move the valve plates to the closed position. However, the design of valves heretofore used has usually been such that the ratio between the forces effective on the valve plates when closed and when closing is much larger than necessary, with the result that the forces applied to the valve plates when in closed positions have been so great as to cause a rapid wear of the valve parts, necessitating frequent replacements.

According to a preferred embodiment of the present invention, a valve is provided with a housing which has openings in the walls thereof, preferably two openings disposed in two walls of the housing which are at right angles to each other. A shaft is rotatably journaled in the housing, preferably in the space between the walls containing the openings and has one end of an arm mounted thereon, the other end being provided with an opening for receiving a bushing provided with top and bottom spherical bearing surfaces. A pin having a ball-shaped intermediate portion is positioned in the bushing so that the ends of the pin extend exteriorly thereof. A pair of plates having interior hemispherical bearing surfaces are mounted on the ends of the pin with the bearing surfaces thereon contiguous to the bearing surfaces of the bushing. These plates are adapted to be moved from closed position over one opening into closed position over the other of the two openings.

The shaft in the housing is preferably rocked by a hydraulic cylinder horizontally mounted on the exterior of the housing. A roll positioned at one end of the piston rod of the hydraulic cylinder is loosely mounted in a slot at one end of a rock arm, the other end of which is keyed to the shaft. Movement of the piston rod is confined by horizontal guides on the housing and the rock arm and piston rod are so located relative to each other that they are at right angles when the rock arm extends perpendicular to the longitudinal axis of the shaft and the plates are in mid-way position between the openings in the walls of the housing, and are at 45° to each other when the plates are in closed position.

In accordance with this invention as will be hereinafter more fully explained, the force exerted on the valve plates in closing and maintaining them in closed position bears a predetermined ratio and preferably is substantially twice the force exerted on the plates in moving them when in mid-way position between the openings. It has been found in practice that a valve constructed as herein disclosed provides a gas-tight closure, is efficient and durable in operation and does not impair the pipe lines or connected apparatus.

This invention accordingly comprises a mechanism for moving the valve plates from closed position over one opening into position over another opening at right angles thereto so that a force of approximately double the force applied to move the plates when in mid-way position is exerted on the plates when in closed position. This invention also involves the mounting of the valve plates back to back on the ends of a pin having an enlarged central portion extending into an opening at one end of an arm so that the plates are permitted universal movement about the ends of the pin and thus proper seating of the valve plates is obtained.

Other objects and advantages will appear from the following detailed description taken in connection with the accompanying drawings in which Fig. 1 is a top elevation partly in section and partly broken away to show the interior construction of the valve and illustrating a preferred embodiment of this invention; and Fig. 2 is a diagrammatic representation of the rock arm on the shaft and the forces acting thereon.

Referring to the drawings, 1 indicates a rectangular housing preferably made from heavy steel plates welded together to form a top 5, bottom 6 and sides 2, 3 and 4. Side plate 7 is secured by bolts to the top, bottom and side plates of the housing so that it may readily be removed permitting access to the interior. An opening 8 is formed in the side wall 4, an opening 9 in the side wall 2 at right angles to the wall 4 and an opening 11 in the bottom 6. While a housing of rectangular configuration is disclosed, it will be understood that this showing is merely for purposes of illustration and that a housing of any desired contour may be utilized. Preferably the openings 8 and 9 are disposed in planes at right angles to each other irrespective of the configuration of the housing in the walls of which these openings are positioned.

If the valve is used in connection with a backrun water gas set, the opening 8 is connected to the backrun pipe, the opening 9 to the superheater offtake and the opening 11 to the washbox of the set. Flanges 12 provided with collars 13 are bolted to the exterior of the walls of the housing and are adapted to be used in connecting the pipes or mains of the water gas set or other apparatus with the desired openings in the housing. A closure plate 15 is positioned over an opening in the top 5 of the housing and a quick-opening door 16 is mounted on the side plate 3 to serve as a closure for an opening in this plate. Pivoted clamp 17 securely holds door 16 in closed position. Inlets 18 are located in the housing to permit the insertion of spray devices therein.

A shaft 20 is rotatably mounted in bearing supports 21 bolted or otherwise secured to the top and bottom walls of the housing. An arm 22 is keyed or otherwise fastened to the shaft 20 and has the end 23 formed with an opening adapted to receive a hollow bushing 24. The bushing 24 is provided with top and bottom spherical bearing surfaces 25, 26. A pin 27 having a central spherical or ball-shaped enlarged portion 28 is mounted in the bushing 24. Two cast steel plates or discs 30 assembled back to back and bolted together by bolts 31 and nuts 32 and provided with hemispherical bearing surfaces 33 are mounted on the ends of pin 27 so that the ends of the pin are positioned in counter-sunk recesses 35 in the discs 30. The bearing surfaces 33 are positioned contiguous to the top and bottom bearing surfaces 25, 26 and are preferably formed with ribs 36 arranged to engage the end of arm 22 thereby limiting the movement of the discs 30. Discs 30 are thus permitted limited movement in all directions and also rotary movement about the pin 23 thereby assuring a seating of the valve in closed position.

An arm 40 has one end keyed or otherwise secured to shaft 20 and the other end formed with a cam slot 41. A hydraulic cylinder or motor 42 is bolted to the top 5 of the housing in horizontal position and has a piston rod 43 reciprocated by the admission and discharge of a suitable pressure fluid into the hydraulic cylinder 42. The end 44 of the piston rod is secured to a head 45 which is guided by horizontal guides 46 bolted to the top 5 of the housing 1. A roll 47 is secured to the head 45 and is arranged to move in the slot 41 of the rock arm 40. Movement of the piston rod by the hydraulic cylinder through the roll 47 and rock arm 40, rocks the shaft 20 to move the discs or plates 30 from closed position over the opening 8 into closed position over opening 9. Flanges 50 are bolted to the interior of the housing over the openings 8 and 9 to provide suitable cushioning supports for receiving the plates or discs of the valve when in closed position.

It will be noted that when the plates are in closed position the longitudinal axis of the arm 40 is at an angle of 45° to the longitudinal axis of the piston rod 43 so that in effect the rock arm makes a 45° angle with the piston rod when the plates are in closed position, and when the plates are in mid-way position between the openings 8 and 9 the arm 40 is at right angles to the piston rod 43.

In Fig. 2 there is indicated diagrammatically the forces on the plates when in closed and mid-way positions. It will be noted that when the plates are in mid-way position the moment (M) exerted on the shaft 20 may be represented by the equation $$M = AF$$

where A indicates the length of the arm affecting the shaft and F indicates the force applied by the hydraulic cylinder through its piston rod, cross-head and roller on the arm.

When the plates are in closed position so that in accordance with the present invention the arm is at a 45° angle with respect to the piston rod, the force F is exerted at an angle of 45° on the rock arm, which force may be resolved into the two components F' and R; acting against the guides 46 and F' acting against the arm 40 representing the effective force tending to rock the shaft 20. Also the effective length of the arm when the plates are in closed position is increased and may be represented by A'.

In view of the 45° angle between the arm and piston rod, as above described, the relation between the forces acting to move and maintain the plates in closed position may be represented as follows:

$$F'^2 = F^2 + R^2 \text{ therefore } F' = \sqrt{F^2 + R^2}$$

and since $R = F$  $F' = \sqrt{2F^2}$ and $A'^2 = A^2 + A^2$ therefore $A' = \sqrt{2A^2}$.

The moment $M'$ exerted on the shaft when the plates are in closed position may be represented by the equation:

$$M' = A' \times F'$$

and in view of the above and since, as above set forth, $$A' = \sqrt{2A^2} \text{ and } F' = \sqrt{2F^2}, \ M' = 2AF,$$

so that it will be seen the force or moment $M'$ exerted on the plates when in closed position is double the force or moment M exerted to move the plates when in mid-way position.

It has been found in practice that a valve constructed as herein disclosed wherein the pressure exerted on the plates in closed position is substantially double the force exerted to move the plates when in mid-way position provides a gas-tight closure and that such valve is durable and efficient in operation and its operation does not deleteriously affect the connecting pipes and apparatus.

While there is shown and described herein as a preferred embodiment of the invention a valve wherein the force exerted on the valve plate when in closed position is substantially double the force exerted to move the plate when in its mid-way position, it is understood that the invention is not limited thereto and that other predetermined ratios between the force applied on the valve plate when in closed position and the force applied to move the plate when in its mid-way position may be provided, as for example, by changing the angular relation between the piston rod and rock arm from the 45° angular relation disclosed herein to the angular relation that will give the desired result.

It will be understood that while we have shown and described a preferred embodiment of our invention various changes in the details thereof may be made by those skilled in the art and this invention is not to be limited to the structure disclosed but only by the scope of the appended claims.

What is claimed is:

1. In a valve, a housing, a shaft in said housing, an arm having one end secured to said shaft and having the other end provided with an opening, a pin mounted in said opening having an enlarged circular intermediate portion and ends extending therefrom through said opening, and plates mounted on the ends of said pin.

2. In a valve, a housing, a shaft in said housing, an arm having one end secured to said shaft and having the other end provided with an opening, a bushing in said opening provided with top and bottom bearing portions, a pin in said bearing member having an enlarged spherical intermediate portion and a pair of plates provided with interior hemispherical bearing surfaces mounted on the ends of said pin with the bearing surface of the plates contiguous to the spherical top and bottom bearing portions of said bushing.

3. In a valve, a housing provided with openings in two adjacent walls thereof, a shaft rotatably mounted in said housing positioned between said adjacent walls, an arm having one end secured to said shaft and having the other end provided with an opening, a pin mounted in said opening having an enlarged spherical intermediate portion and ends extending therefrom through said openings, plates mounted on the ends of said pin, a hydraulic cylinder having a piston rod, a roll on said piston rod, guides for said piston rod, and a rock arm having one end secured to said shaft and the other end provided with a slot to receive said roll.

4. In a valve, a rectangular housing provided with three openings, the openings in two adjacent walls serving as inlet openings and the remaining opening serving as an outlet opening, a shaft rotatably mounted in said housing positioned between the two adjacent walls containing the inlet openings, an arm having one end secured to said shaft and having the other end provided with an opening, a pin mounted in said opening having an enlarged circular intermediate portion and ends extending therefrom through said opening, plates mounted on the ends of said pin and adapted to be moved from closed position over one of said openings into position to close the other of said openings, a hydraulic cylinder having a piston rod, a roll on the piston rod, guides for said piston rod, a rock arm having one end secured to said shaft, and the other end provided with a slot to receive said roll, the rock arm and piston rod being so located relative to each other that they are at right angles when said pair of plates are mid-way between said openings and at 45° to each other when said plates are in closed position over said openings.

In witness whereof we have hereunto set our hands.

OLAV TWEIT.
SYBREN R. TYMSTRA.